Oct. 2, 1934.  G. A. CUTTER  1,975,225
ELECTRIC WELDING
Original Filed Jan. 23, 1929    3 Sheets-Sheet 1

Inventor
George A. Cutter.
By R. S. C. Dougherty.
Attorney

Oct. 2, 1934.  G. A. CUTTER  1,975,225
ELECTRIC WELDING
Original Filed Jan. 23, 1929   3 Sheets-Sheet 2
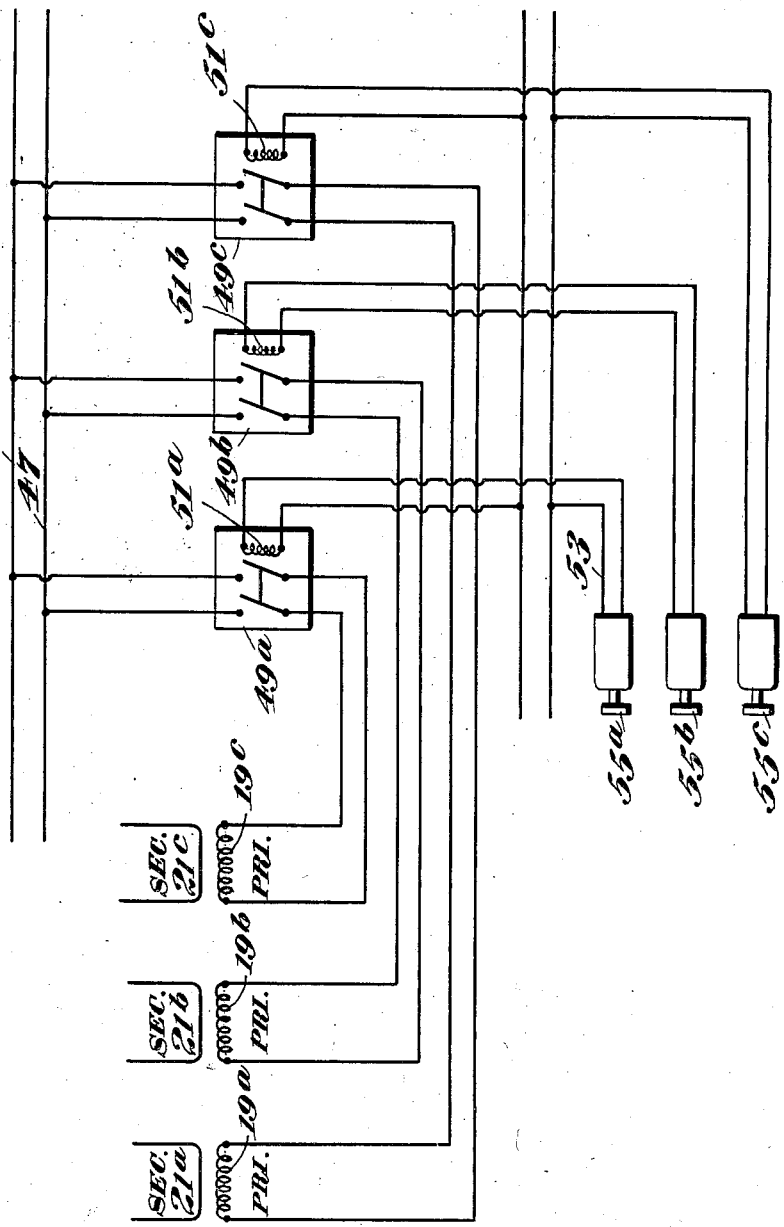
Inventor
George A. Cutter.
By R. S. A. Dougherty.
Attorney Oct. 2, 1934.    G. A. CUTTER    1,975,225
ELECTRIC WELDING
Original Filed Jan. 23, 1929    3 Sheets-Sheet 3
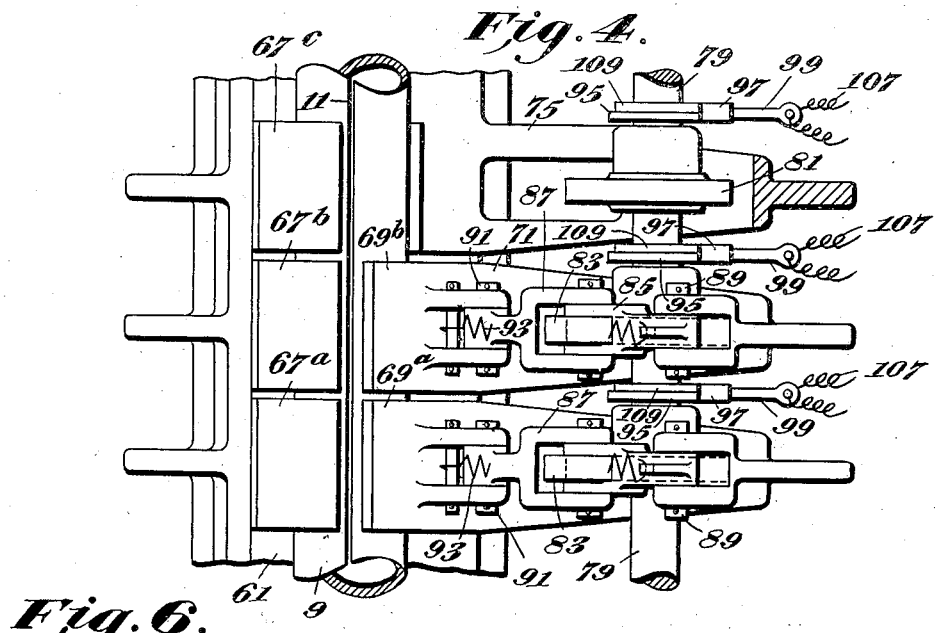
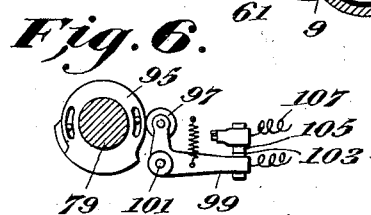
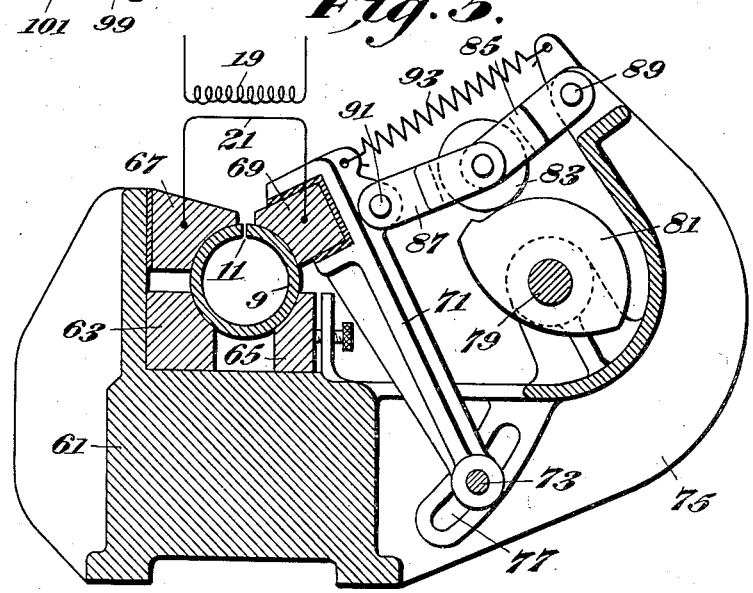
Inventor
George A. Cutter.
By R. S. C. Dougherty.
Attorney Patented Oct. 2, 1934

1,975,225

UNITED STATES PATENT OFFICE 1,975,225

ELECTRIC WELDING

George A. Cutter, Dedham, Mass., assignor to Thomson-Gibb Electric Welding Company, a corporation of Massachusetts Original application January 23, 1929, Serial No. 334,540, now Patent No. 1,924,915, dated August 29, 1933. Divided and this application January 27, 1933, Serial No. 653,835

2 Claims. (Cl. 219—10)

This invention relates to improvements in electric welding and more particularly to improvements in butt welding metallic walls where the surface pressure of one or more movable electrodes against the walls to be united is utilized to close the joint and weld together the opposed, disunited edges thereof.

This application is a division of my copending application Serial Number 334,540, filed January 23, 1929, now Patent No. 1,924,915 issued August 29, 1933.

The invention is herein shown for illustrative purposes as applied to the butt welding of a pipe blank in the form of a tubular skelp, but is not limited to that or to any one specific purpose, and may be usefully applied to the welding of other tubular and other hollow bodies, as well as to the butt welding of the disunited edges of any metallic walls where the surface pressure and contact of the electrodes are availed of to force the edges into welding relationship.

In making such application of the butt welding process to metallic bodies having walls of substantial thickness and a joint of substantial length, I have found that electrodes should be employed having a conductive bearing over a substantial area in order to apply an adequate welding current, and provision should be had for applying a substantial and controllable pressure against the walls of the body to close the joint during the welding operation, which pressure should be susceptible of independent application at different points lengthwise the joint.

In the illustrative embodiment of the invention where it is shown applied to the specific instance of welding a pipe blank, this object is secured by providing a support for the blank in which the latter is held in fixed position during the welding operation, and further in providing a plurality of electrodes lengthwise the joint movable each independently of the other transverse to the walls of the blank, each electrode having a conductive bearing over a substantial portion of the external walls of the blank. These electrodes are distributed lengthwise the blank and arranged to bear against successive portions thereof. The blank is so held and the electrodes are so positioned adjacent the disunited edges of the blank and caused to move in such a direction transversely the blank, that movement of each individual electrode is caused to apply the pressure required to compress together the edges of the joint to be welded and to establish the pressure current conditions appropriate to meet the requirements at that part of the blank coming within the influence of that particular electrode.

The invention as to the features above indicated, and as to other features thereof, will be best understood by reference to the following description when taken in connection with the accompanying illustration showing one specific embodiment thereof, while its scope will be more particularly pointed out in the appended claims.

In the drawings:—

Fig. 3 is a diagrammatic representation of the control circuits which may be employed for the apparatus illustrated in Figs. 1 and 2;

Fig. 4 is a plan view of a modified form of apparatus for carrying out the invention in which the pressure and current are automatically controlled;

Fig. 5 is an elevation in partial section of the apparatus shown in Fig. 4; and

Fig. 6 is a detail of the current controlling switch employed in the machine of Fig. 4.

Figure 1:
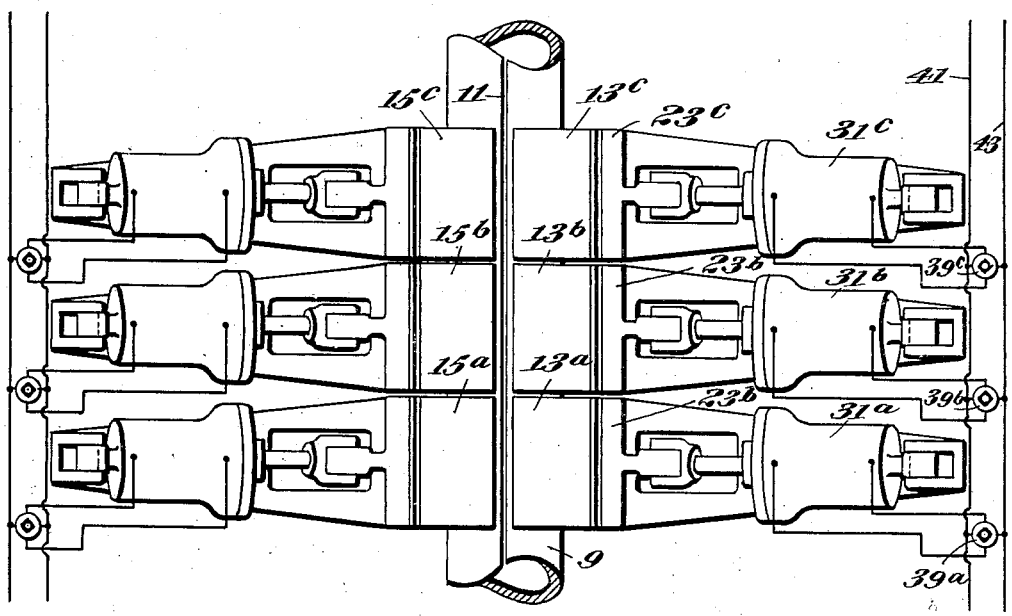
Fig. 1 shows in plan an apparatus for carrying out this invention embodying one form of the invention and designed to close by butt-welding the joint of a tubular skelp or pipe.

Referring to the drawings and to the illustrative embodiment of the invention therein disclosed, the illustrative apparatus for practising this invention is provided with the bed 5 carrying a holder 7 for holding a tubular blank 9 to be welded, the bed and holder being elongated in the direction of the blank 9 and extending beneath the same for any desired distance. Any form of holder may be employed, either in fixed or roller form, suitable for positioning the blank in fixed position during the welding, the one here-in shown comprising a block, preferably of steel, cast iron or other metal of relatively low conductivity as compared with copper, and providing a concave seat adapted to receive the blank and hold the same in opposition to the pressure exerted by the electrodes.

The tubular member 9 is herein shown as a pipe blank or tubular skelp rolled from one continuous metallic sheet into tubular form, leaving the unjoined seam or discontinuous portion 11, the edges of which are to be joined by welding and formed into an otherwise peripherally closed hollow blank. This blank may be introduced, if desired, automatically or otherwise into the welding apparatus directly from the skelp and finishing rolls.

Movably mounted on the base 5 and arranged at intervals to engage successive sections or portions of the pipe blank is a series of electrodes 13a, 13b, etc. This series may be extended to include any desired number for the welding of any desired length of pipe, but to simplify the illustration three members only of the series are shown. Each electrode comprises a block of copper or other good conductor having a concave bearing face to fit and seat against the external cylindrical walls of the blank preferably adjacent the joint to be closed, each electrode providing a conductive bearing face contacting with the blank over a substantial area thereof in close proximity to the unclosed joint.

Figure 2:
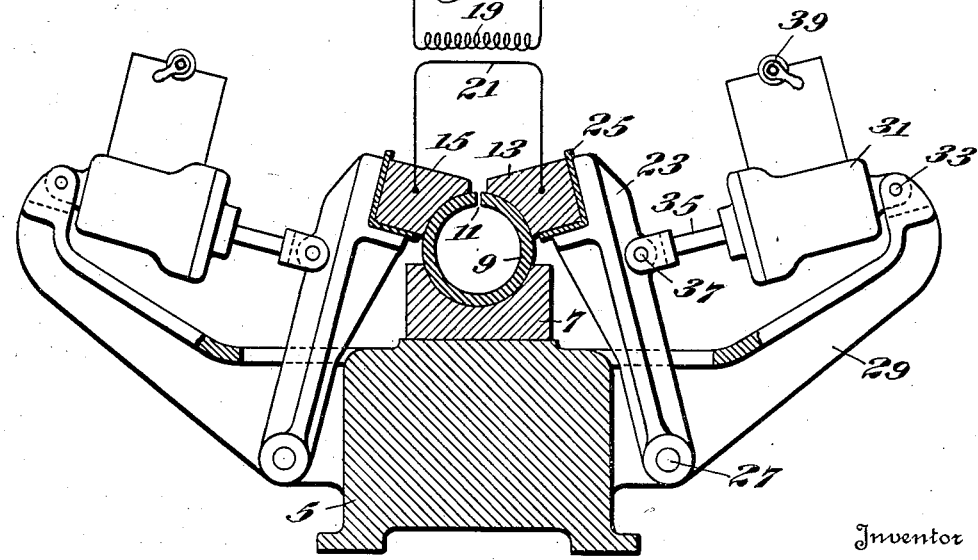
Fig. 2 is an elevation in partial section of the apparatus shown in Fig. 1.

Each of the electrodes 13a, 13b, etc. is arranged to cooperate with a companion electrode similarly constructed and symmetrically located with reference to the joint 11 on the opposite side thereof, the companion electrodes 15a, 15b, etc. constituting a similar but oppositely located series adapted to engage and bear against successive portions of the pipe blank. Current is conveyed to each pair of companion or opposite electrodes 13 and 15 through separate circuits, the latter comprising the usual flexible conductors connected to the secondary of a transformer of the usual well known type. In Fig. 2 one such circuit 17 is shown in diagrammatic form only, the primary winding of the transformer being represented at 19 and the secondary at 21.

The two opposing electrodes of each pair are herein capable of relative movement toward and away from each other in a direction transverse to the joint and to walls of the blank, each pair being capable of such movement independently of the movement of other pairs of the two series, and are so applied to the pipe length that through relative movement toward each other they compress between them the edges of the seam under a pressure which can be separately varied or controlled for each pair.

To this end each electrode 13 is carried by a lever arm 23, from which it is suitably insulated by the insulating material 25, the arm being pivoted at 27 to a bracket 29 provided on the base. To apply the necessary pressure to the electrode, there is provided a pressure cylinder 31 pivotally mounted at 33 on an extension of the bracket 29, the piston rod 35 for the cylinder having jointed connection at 37 to the lever arm 23. The electrode 13 may be forcibly applied to the pipe blank or withdrawn therefrom by admitting fluid pressure to and exhausting it from the appropriate ends of the cylinder 31 by means of the control valve 39 connected to a suitable supply of fluid pressure. The location of the electrode with relation to the blank, the positioning of the lever 23, the direction of application of pressure through the cylinder 31, and the support which is afforded the blank by the holder 7 are such as to secure an effective closing of the blank and an effective application of welding pressure to the joint, tending to force the two separated parts of the blank into intimate contact with each other, while at the same time providing for the contraction of the blank in substantially true cylindrical form.

Each pair of the series of electrodes 13 is provided with similar pressure applying means, the several control valves 39a, 39b and 39c being connected to common pressure supply and exhaust mains 41 and 43 respectively.

The opposing series of electrodes 15a, 15b, etc. are provided with similar independently controlled pressure devices, but, as the construction and arrangement of the parts shown in the illustrative embodiment of the invention are substantially the same as those already referred to, no further description is necessary.

So long as the different members of the electrode series are independently movable, their adjoining faces may be in contact with each other or may be separated more or less. Furthermore, the independent application of the pressure to different parts of the blank may be had by maintaining stationary or fixed one series, such as the electrodes 15a, 15b, etc. (see Figs. 4 and 5), or such series may, if desired, be united into a single, continuous, stationary electrode co-extensive in length with the length of the opposing series, the welding and blank closing pressure in either case being then secured alone by the independent movement of the several members of the oppositely disposed electrodes 13a, 13b, etc.

The apparatus so far described may be employed in connection with a source of welding current derived through a single transformer having a single primary winding in inductive relation to the several secondaries through which current is separately supplied to the several individual electrodes of the series, the primary circuit having a single current controller common to all the secondaries or with a source of welding current supplied to a plurality of such primary windings, one or more of which are in inductive relation to a plurality of such secondaries, and these and other varying circuit arrangements are within the contemplation of my invention.

In the preferred embodiment thereof, however, each secondary circuit and each pair of electrodes is supplied through an independent primary winding, the latter connected with the source of power through its independent controlling device, so that the welding current supplied to each pair of electrodes, as well as the welding pressure exerted thereby, may be independently applied and controlled at will.

In Fig. 3 I have shown diagrammatically the connections employed for this purpose, the current being supplied to the several primary windings 19a, 19b, etc. from the mains 45 and 47 through the switches 49a, 49b, etc. The several switches are under the control of magnets 51a, 51b, etc., respectively, adapted to be energized from the low voltage control circuit 53 through the push buttons 55a, 55b, etc., so that by manipulating the push buttons the welding current may be applied to the several pairs of electrodes in any order and in any time relationship desired and in any desired relation to the application of the welding pressure.

The transformer primary or primaries may have any of the usual control devices for varying the applied voltage, as by varying the number of turns in the primary winding, and it will be understood that any of the control features customarily employed in welding machines may be utilized herein.

The welding process may be carried out with the described form of machine in a variety of ways. After the pipe blank has been placed in the machine and on the rest or holder 7 and the electrodes have been brought into contact therewith, one or more sections of the blank may be first brought to a welding temperature by the application of the welding current therethrough and a suitable welding pressure thereafter applied to such section or sections, and the same sequence of steps then performed for succeeding lengths of the blank until the entire blank within the machine has been welded by this step-by-step operation. Or, after one or more sections have been preheated, and while such section or sections are being subjected to the welding pressure, the welding current may be applied to an adjoining section or sections for preheating the same and the process carried on progressively, and, if desired, by overlapping steps from end to end. In either method, any variation in the welded conditions which might arise from uneven contact of the adjacent edges to the seam, due to minor irregularities of contour or to rust, scale, or the like, may be met by the application of pressure of the requisite amount to meet such local conditions.

Or, again, if desired, the current may be applied to the entire series of electrodes for preheating the blank throughout its entire length, and when the entire joint has reached a welding temperature, the welding pressure may be applied throughout.

It will also be seen that, while the series of electrodes may be extended in number to provide a machine of such length as to weld pipe of any desired length, pipe of greater length than the length of the machine may be welded by first welding the section of pipe corresponding to the length or capacity of the machine, and then successively moving the unwelded portions of the pipe into the machine and subjecting them in succession to the welding operation. Furthermore, pipe of indefinite length may be formed by welding together successive length of skelp.

In Figs. 4 to 6 inclusive there is shown a machine similar in principle to the machine illustrated in Figs. 1 and 2, but provided with means for mechanically and automatically controlling the pressure and the current for the several electrodes of the group and for timing the current with relation to the pressure in the case of each electrode and for each electrode with relation to the others of the series.

Referring to Figs. 4 and 5, the bed 61 is provided with supports 63 and 65 for the blank and also carries a plurality of stationary electrodes 67a, 67b, 67c, etc., the latter being arranged in aligned relation lengthwise the joint, insulated from the bed, and positioned to engage the blank closely adjacent the joint 11. On the opposite side of the joint is a series of movable electrodes 69a, etc., the electrode 69c being removed to show the underlying construction of the frame and the cam. Each electrode 69 is carried by an arm 71 supported by the pivot 73 which is adjustably fixed on the supporting bracket 75 in the slot 77, so that the direction of its movement transversely the blank may be adjusted.

To actuate the electrode 69 there is provided the cam shaft 79 journaled in bearings carried by the brackets 75 and provided with a series of cams 81 engaging the respective cam rolls 83, there being provided one cam and one cam roll for each electrode. Each cam roll 83 is journaled between the forked ends of jointed links 85 and 87 constituting two arms of a toggle, the link 85 being pivotally mounted at 89 on the corresponding bracket 75 and the link 87 being pivotally connected to its corresponding arm 71 at 91. As the shaft 79 rotates, the arm 85 is raised, forcing the electrodes 69 against the blank, the spring 93 withdrawing the electrode as the cam roll moves down against that portion of the cam which is of reduced diameter.

The angular position of the several cams on the cam shaft may be adjusted to provide a differentiation in the timing of the individual cams or change the timing of an entire group, so that any desired relationship may be had in the movement of the individual electrodes. The individual cams may also be so shaped and proportioned as to provide any desired order or cycle of electrode movement, as, for example, that required for pressure welding or that required for flash welding.

The rotation of the cam shaft is also utilized for controlling the current in timed relation to the electrode movement, there being provided for this purpose for each electrode a switch-actuating cam 95 (Fig. 6) engaging the cam roll 97 carried by the bell crank lever 99 pivotally mounted at 101. The opposite end of the bell crank lever carries a contact 103 engaging the stationary contact 105, the two contacts being included in the primary circuit 107 controlling the current through that particular electrode, each electrode being supplied with current from separate primary windings, as in the machine shown in Figs. 1 and 2. As the cam shaft rotates, the bell crank lever is moved, causing it to successively open and close the primary circuit, maintaining the latter open or closed for an interval of time, depending on the shape of the cam. The cam 95 is adjustably mounted upon a plate 109 carried by the shaft 79, so that its angular position may be adjusted and the timing of the current varied. By adjusting the cams on shaft, or by suitably varying the shape of the cams, the application and the duration of the current may be given any desired time relation with respect to the electrode movement so that any desired current condition may be established for any particular electrode in carrying out the welding operation.

If desired, the opposed series of electrodes 67 may be movably mounted, as in the apparatus of Figs. 1 and 2, and provided with cam actuated devices for controlling the movement thereof, similar to those employed for moving the electrodes 69.

It will be observed that the pressure exerted by the electrode against the blank is diametrically opposed by the support 63, the blank being held by the supports 63 and 65 and by the electrodes 67 and 69, each having a bearing contact over a substantial part of the area of the blank, so that the latter during the welding operation tends to be contracted into substantially true cylindrical form. The adjustment of the pivot pins 73 provides means for adjusting the direction in which the movement of the electrode 69 takes place with relation to the blank. It is desirable that the electrode, during its movement, should maintain a substantially fixed seat against the blank and have no substantial sliding movement thereover. In the machines illustrated this result is had by so fixing the pivot of the electrode supporting arm that the movement of the electrode is approximately radially inward with relation to the blank, or toward the axis of the tube. The adjustment of the pivot 73 permits this relationship to be established for blanks of varying size.

While I have shown the invention applied to the welding of a tubular, cylindrical pipe of uniform, circular cross section, it is applicable to the welding of hollow objects having a great variety of shapes, including those of non-circular or ununiform cross section, as well as those which are tubular or open from end to end, but are intended to be subsequently closed as by the provision of an end closure. And, although the invention is especially applicable to welding the adjacent edges of a tubular body, or the like, formed from a continuous piece of metal into an otherwise peripherally closed, hollow body, it may be usefully applied to butt welding the edges of bodies formed from a plurality of sections or blanks.

While I have herein shown and described for the purposes of illustration one specific embodiment of the invention, it is to be understood that extensive changes and deviations may be made from the illustrated form and relative arrangement of parts, all without departing from the spirit thereof.

Having thus described my invention what I claim as new and desire to secure by Letters Patent is:

1. The method of electrically butt welding adjacent opposed edges of the metallic walls of a body having an elongated joint which consists in holding the parts stationary with the disunited edges in close opposed relationship to each other, applying welding current separately to longitudinally distributed and adjoining portions of the parts, and applying welding pressure progressively to adjoining succeeding portions of the parts to complete the weld.

2. The method of manufacturing welded tubing of a substantially uniform dimension which consists in holding the blank tubing stationary with the disunited edges in close opposed relationship to each other, applying welding current separately to longitudinally distributed and adjoining portions of the blank, and separately applying welding pressure progressively to adjoining succeeding portions of the blank to complete the weld.

GEORGE A. CUTTER.